US007832258B2

(12) United States Patent
Mudge et al.

(10) Patent No.: US 7,832,258 B2
(45) Date of Patent: Nov. 16, 2010

(54) ATOMIZER MONITORING SYSTEM

(75) Inventors: Robert P. Mudge, Rapid City, SD (US); Shawn M. Veurink, Rapid City, SD (US)

(73) Assignee: RPM Solutions, Inc., Rapid City, SD (US)

( * ) Notice: Subject to any disclaimer, the term of this patent is extended or adjusted under 35 U.S.C. 154(b) by 658 days.

(21) Appl. No.: 11/780,268

(22) Filed: Jul. 19, 2007

(65) Prior Publication Data

US 2008/0016972 A1 Jan. 24, 2008

Related U.S. Application Data

(60) Provisional application No. 60/807,841, filed on Jul. 20, 2006.

(51) Int. Cl.
*G01N 17/00* (2006.01)

(52) U.S. Cl. .......................................................... 73/86

(58) Field of Classification Search ....................... None
See application file for complete search history.

(56) References Cited

U.S. PATENT DOCUMENTS

RE030,963 E 6/1982 Moller et al.
4,751,484 A * 6/1988 Matsumoto et al. ........... 399/25
5,356,075 A 10/1994 Heide et al.
5,370,310 A 12/1994 William
5,817,958 A * 10/1998 Uchida et al. .............. 73/865.9
6,659,375 B1 12/2003 Mudge et al.
2005/0246068 A1 * 11/2005 Hayashi et al. ............. 700/287

* cited by examiner

*Primary Examiner*—Robert R Raevis
(74) *Attorney, Agent, or Firm*—Caesar, Rivise, Bernstein, Cohen & Pokotilow, Ltd.

(57) ABSTRACT

An atomizer monitoring system monitors parts or components that are utilized in atomizers for flue gas desulfurization or in spray drying applications, taking into account each part's longevity, installation date, and expiration period, using wireless sensors and radio frequency identification ("RFID") technology, whereby small, inexpensive RFID tags are placed on, or embedded in the atomizers, for example, in an atomizer wheel. The monitor system can avoid failure of parts within an atomizer and costly downtime associated with removal and replacement of parts that have reached their useful life. The preferred embodiment utilizes radio frequency identification ("RFID") technology which is linked to a web-based data base.

19 Claims, 10 Drawing Sheets

LIFE EXPECTANCY

| RPM SOLUTIONS | |
|---|---|
| LID | 12,000 |
| CASE | 24,000 |
| DRIVE PLATE | 24,000 |
| NOZZLES | 6,000 |
| UPPER WEAR RING | 8,000 |
| LOWER WEAR RING | 40,000 |
| SPINDLE | 16,000 |
| GEARBOX | 8,000 |

| OEM | |
|---|---|
| LID | 24,000 |
| CASE | 24,000 |
| DRIVE PLATE | 24,000 |
| NOZZLES | 6,000 |
| UPPER WEAR RING | 8,000 |
| LOWER WEAR RING | 40,000 |
| SPINDLE | 16,000 |
| GEARBOX | 8,000 |

| OTHER | |
|---|---|
| LID | 4,000 |
| CASE | 4,000 |
| DRIVE PLATE | 4,000 |
| NOZZLES | 4,000 |
| UPPER WEAR RING | 4,000 |
| LOWER WEAR RING | 2,000 |
| SPINDLE | 16,000 |
| GEARBOX | 0 |

BACK TO ATOMIZER PAGE

*FIG. 10*

ATOMIZER MONITORING SYSTEM

CROSS-REFERERENCE TO RELATED APPLICATIONS

This application is a nonprovisional application of U.S. Provisional Application No. 60/807,841, still pending, filed Jul. 20, 2006.

FIELD OF INVENTION

This invention relates to the monitoring of parts, and in particular, to the monitoring of parts that are utilized in atomizers for flue gas desulfurization or in spray drying applications.

BACKGROUND OF THE INVENTION

Flue gas desulfurization systems are typically used in coal fired power plants, waste-to-energy plants and in incinerators. A typical desulfurization system will include a processing or treatment chamber wherein flue gases are subjected to desulfurization treatment. Positioned inside that chamber is a high speed rotating atomizer wheel through which desulfurization treatment slurry is dispersed into the chamber and the gas therein in order to initiate the desulfurization process. Typically, the atomizer wheels are circular with a circumferential sidewall that includes wear insert openings that project through the circumferential sidewall. Typically, the atomizer wheels are between eight and fourteen inches in diameter.

Such a desulfurization system might typically be powered by drive systems that include motors in the 160 to 1100 horsepower range that rotate the atomizer wheels at speeds of 8,800-10,000 rpm and upwards to 15,000 rpm. While these wheels are rapidly rotating at these very high speeds, a slurry treatment mixture, typically of water, lime and other inert materials of upwards to 20%-40% solids, is fed into the wheels at rates ranging typically between 20-150 gallons per minute. Replacement of any parts within these wheels requires shutting down and/or bypassing the reactor chamber in which the atomizer is located, removing the atomizer from the reactor chamber, installing a different atomizer into that atomizer chamber, removing the atomizer wheel from the atomizer, allowing the atomizer head to cool, and then disassembling the atomizer head to gain access to the worn part(s) that need(s) to be replaced. This is a laborious task and time consuming. In order to maintain EPA guidelines, these atomizer wheels must be operated on a continuous basis to prevent harmful sulfur components of the flue gas from escaping into the atmosphere. Thus, downtime for pulling atomizers out of service for parts replacement must be minimized.

A typical atomizer wheel that is the subject of the improvement of the present invention is shown in U.S. Pat. No. 6,659,375. Atomizer wheels of a similar type are also disclosed in U.S. Pat. No. 5,370,310; U.S. Re. Pat. No. 30,963; and U.S. Pat. No. 5,356,075.

Atomizer systems are composed of several dozen parts, some replaceable, some stationary, some movable and/or critical to the operation of the atomizer system. In addition to the atomizer wheel, the atomizer system includes an atomizer motor and a gear box, each of which may contain hundreds of parts. Keeping track of the existence and/or status of hundreds of parts within a group of atomizer systems is not only a complex task, but virtually impossible with currently available systems. Because of the number of parts involved, and the importance of maintaining 100% availability of the atomizer systems, the inventorying and managing of such parts has become more and more important.

Taking inventory of any type of article is a time-consuming and difficult task that must be done in all industries. To simplify the inventory process, many systems have been developed for marking serial numbers on parts that use metal etching, metal stamping, chemical etching and laser marking to track components within a system of atomizers. However, these systems suffer from significant limitations, including a line-of-sight requirement for accurate readings, no permanency for marking part numbers which often wear away, space limitations on parts for marking identification numbers, parts being made of materials unsuitable for marking due to surface characteristics and part numbers concealed during use with other parts. Inspection of atomizer parts is both inefficient and risky, requiring separation and reassembly of numerous assemblies within the atomizer, which may affect tolerances and operability of the reconstructed assemblies over time. The inventors recognized the problems associated with the background art, and conceived the preferred embodiments at least partly in response thereto. All references cited herein are incorporated herein by reference in their entireties.

BRIEF SUMMARY OF THE INVENTION

The preferred embodiments include a system for monitoring parts that are utilized in machines (e.g., atomizers) for flue gas desulfurization or in spray drying applications, taking into account each part's longevity, installation date, and expiration period, using radio frequency identification ("RFID") technology, whereby small, inexpensive RFID tags are placed on, or embedded in the atomizers, for example, in an atomizer wheel. The present invention accurately documents the wear life of components and provides information to precisely control inventories and scheduled maintenance events; which leads to the avoidance of the surprise failures of parts within an atomizer and/or the costly downtime associated with removal and replacement of parts that have not reached their useful life. At this juncture, it is important to mention that use of the parts monitoring system of the present invention is not limited to flue gas desulfurization. The system of the present invention may be used in a variety of other operating systems wherein multiple components are used having different lengths of wear life, wherein the wear life of those wear components cannot be determined, e.g., serial numbers cannot be viewed during normal operation, and there is no system in place for tracking wear life. Typically these type of applications would be for systems that have very long runtime between maintenance events. For example, the system of the present invention could be used for tracking parts in a coal pulverizer mill, large pumps or fans, turbines, etc.

The preferred embodiment of the present invention utilizes radio frequency identification ("RFID") technology to store data. Said data is "written to" or "read from" strategically located RFID tags via a RFID writer/reader preferably in a mobile PC. This data is accumulated in a "Mobile" PC and then transferred via wireless technology to a "Host" computer. Data from the Host computer is transferred to a website via cellular broadband network or modem type land line. As a skilled artisan would readily understand, a basic RFID system consists of three components: (1) an RFID writer/reader having an antenna; (2) a host computer or multiple computers; and (3) an RFID tag electronically programmed with unique information. A writer/reader emits radio signals to activate the RFID tag and can read and write data to the RFID tag. The writer/reader is operatively coupled to the mobile computer for exchanging data therewith and is configured to exchange data over a wireless communications link with one or more RFID tags. The writer/reader is preferably disposed in a handheld or portable unit, such as the mobile PC, and is suitable for an operator to move around an atomizer to exchange data with the host computer via a conventional wireless communications link. Of course the mobile computer (PC) can also communicate as needed to a remote website over the internet, for example, to update information of the atomizer parts and download directions for changing and servicing the atomizers. Thus the mobile PC has the capabilities to communicate with the RFID tags (via an embedded writer/reader), the host computer, and to a website via the internet.

Each RFID tag advantageously requires no self-contained battery for operation. Instead, the RFID tag obtains operating power from the radio frequency (RF) or electromagnetically coupled RFID writer/reader when in proximity thereto. It will be recognized by those of ordinary skill in the art that the format of the data stored in the RFID tags optionally is either in an industry standard format, or optionally is a predetermined proprietary format understood by a software application associated with the CPU.

When a RFID tag comes into contact with the electromagnetic field generated by the writer/reader, the RFID tag detects the writer/reader's activation signal and responds accordingly with a separate signal generated by the RFID tag containing data stored in the RFID tag's integrated circuit. While not being limited to a particular theory, the writer/reader decodes the data provided by the RFID tag and passes that data to a host computer for processing, which determines the course of action that must be taken with respect to the corresponding part. The host computer preferably takes that information and reports it to the web page. Alternatively, a cellular card can be placed in the writer/reader to enable sending information to the web page and bypassing the computer.

Those of ordinary skill in the art will recognize that additional standard components optionally are operatively coupled to the host computer, such as, but not limited to, data storage devices, printers, and communication interfaces (i.e. local area networks, Internet connections, 802.11 transceiver, Bluetooth transceiver, Infrared port, USB port, 1394 FireWire), within the scope of the present invention.

The present invention can be distinguished from the prior art in several important ways. First, the present invention increases the safety of facilities where desulfurization or spray drying is carried out. Safety is an ongoing concern in all aspects of life, and coal fired power plants and spray drying facilities are no exception, especially with respect to the replacement of damaged or worn parts. Though many manufacturers use warning labels instructing users to replace damaged or worn parts only with the appropriate equivalent parts, there is no means of verifying such compliance. The exemplary embodiments of the present invention provide the benefit of enabling compliance verification and provide a tool for ensuring timely replacement.

Second, the exemplary embodiments of the present invention significantly enhance convenience. For example, modern coal fired power plants have many parts that require periodic replacement. The present invention, through constant verification, provides such a capability, enabling more accurate information to be provided to the user. These features are not contemplated or anticipated by the prior art.

The present invention reduces the amount of paperwork involved with tracking numerous parts that make up the multiple atomizer wheels located within a coal-fired power plant, waste-to-energy plants and in incinerators, by tracking these parts using radio frequency identification tags and a computerized monitoring system. The present invention also enables one to determine a cost for use of an atomizer wear part based upon the initial cost of the part and the length of service of that part before that part is considered worn out. In addition to cost per unit comparisons, under the present invention, the life of atomizer wear parts can be correlated to the amount of slurry used, the amount of lime used or the amount of sulfur removed. Many sets of data may be monitored during the operation of the atomizer and then compared to the operational wear life of any of the atomizer parts that are being tracked by the atomizer monitoring system. The present invention is a budget/inventory management tool.

The exemplary embodiments of the invention include a system and method for collecting data relating to the parts of atomizer wheels situated within a coal-fired power plant and using such data to determine if such parts are worn out or damaged and in need of replacement. The system entails the deployment of a plurality of radio frequency identification tags on or within various parts of the atomizer wheels that are capable of issuing radio frequency signals containing data related to each corresponding part. A radio frequency transceiver capable of interfacing with and receiving data stored within each tag operates in conjunction with a central processor unit of a computer capable of analyzing the data from each tag and determining whether the atomizer wheel needs parts to be replaced or can be operated with its existing set of parts.

The exemplary embodiments provide a system and method for gathering data concerning parts within atomizer wheels of a coal fired power plant, or other complex structures such as a spray drying facility which is comprised of multiple mechanical parts, and using that data to determine whether the parts are the appropriate parts for use in that structure and for indicating when parts need to be replaced so as to increase the operational efficiency and safety of the structure. The system uses RFID technology to initially associate data from different parts and to facilitate the identification of those parts in the future. In particular, small, relatively inexpensive RFID tags are placed on, or embedded in, various different parts of the structure. In the context of an atomizer wheel located within a coal fired power plant, although numerous different parts could be labeled with RFID tags, the preferred embodiment of the present invention is primarily focused on placing an RFID tag on the chamber in which one or multiple atomizer wheels are located, embedding RFID tags in the lid of each atomizer wheel housed within each chamber, and placing RFID tags on other parts of the atomizer including the atomizer motor and gearbox assembly. Preferably any of the tags allow the association of data with numerous different parts of the atomizer, thereby lowering the need for a separate tag for each part, as discussed for example in greater detail below.

BRIEF DESCRIPTION OF SEVERAL VIEWS OF THE DRAWINGS

The invention will be described in conjunction with the following drawings in which like reference numerals designate like elements and wherein:

FIG. 10 depicts a life expectancy page showing the expected service time life expectancy for various parts of the atomizer head from various manufacturers.

DETAILED DESCRIPTION OF PREFERRED EMBODIMENTS OF THE INVENTION

Figure 1:
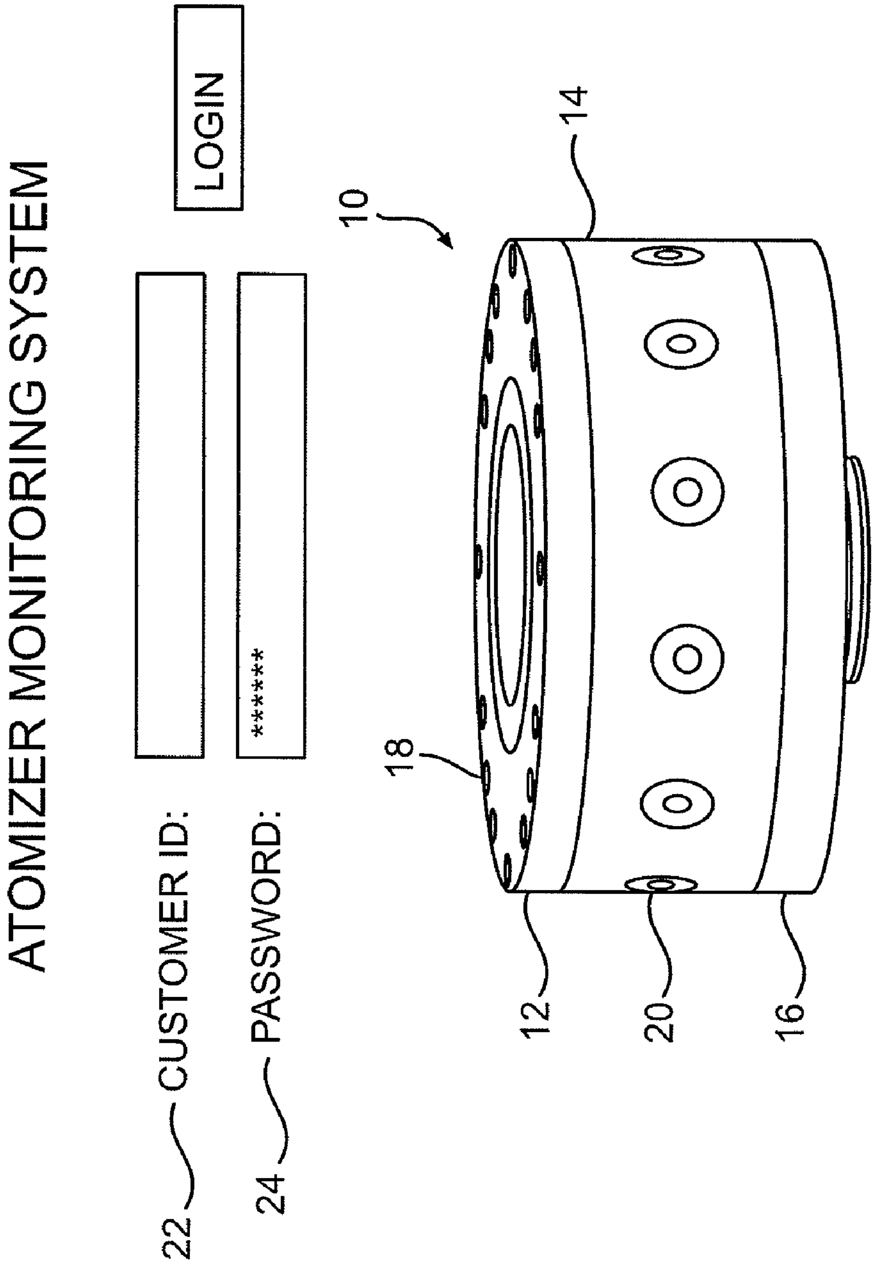
FIG. 1 shows a home page for the web-based RFID system of the present invention and a perspective view of an atomizer wheel in accordance with the preferred embodiments.

Referring now in detail to the various figures of the drawings wherein like reference characters refer to like parts, there is shown in FIG. 1 a prospective view of an atomizer wheel 10 having a lid 12, a case 14 and a drive plate 16. The lid 12 and case 14 are attached via threaded head cap screws 18 that are inserted into the lid and threadingly engage the case. Typically the atomizer wheel 10 includes a plurality of wear inserts 20 positioned within ejection orifices located on the circumference of the sidewall of the case 14. While not being limited to a particular theory, during operation the atomizer wheel 10 rotates at very high speeds and multiple atomizer wheels may be located within a processing or treatment chamber where flue gases are subjected to desulfurization treatment within a flue gas desulfurization system of a coal fired power plant or incinerator. The atomizer wheel 10 preferably also includes, wear rings, wear nuts, lids, cases, lower drive plates, o-rings, among other parts. FIG. 1 also depicts a home page for the web-based RFID system of the present invention. The home page enables a user to type in customer identification information 22 and a password 24 in order to gain access to the system.

Figure 2:
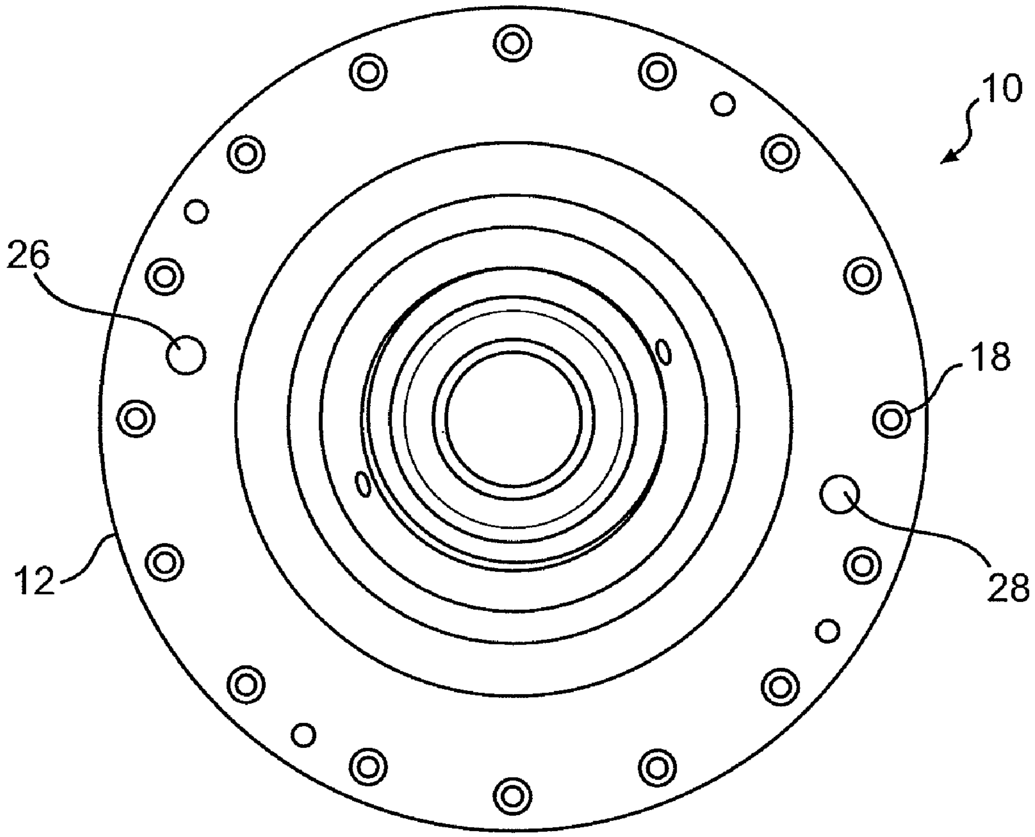
FIG. 2 is a top view illustrating an exemplary atomizer wheel with RFID implants in accordance with the preferred embodiments.

Referring now to FIG. 2, there is shown two RFID tags implanted in the lid 12 of an atomizer wheel 10. As mentioned previously, atomizer wheels often rotate at speeds of 8,800-10,000 rpm and upwards to 15,000 rpm. As shown in the figure, two slots are milled into the lid 12 and a first RFID tag 26 is implanted at one side of the atomizer wheel 10 while a second RFID tag 28 is implanted at the opposite side of the atomizer wheel for back up or redundancy and to provide balance during rotation. The implanted RFID tags 26, 28 are encapsulated within a resilient temperature resistant material (e.g., silicon, resin, ceramic) that allows radio frequency communication therethrough. The resilient temperature resistant material protects the encapsulated tags from exposure to the caustic abrasive heated environment associated with atomizer wheels, and helps to secure the tags to their location.

The two RFID tags implanted in the lid 12 contain information relating to all parts within the atomizer wheel 10, e.g., the lid, the case 14, the drive plate 16, the wear inserts 20, the wear rings, the wear nut, o-rings, among other parts. Another RFID tag 38 is placed somewhere on the atomizer motor/gearbox assembly containing information relating to parts within the atomizer (e.g., the spindle, gearbox, bearings, oil). This RFID tag includes data on the drive and feed components of the atomizer. Likewise, an RFID tag will be located at other locations of a typical desulfurization system, such as on or near a reactor or chamber, identifying that reactor or chamber.

Figure 3:
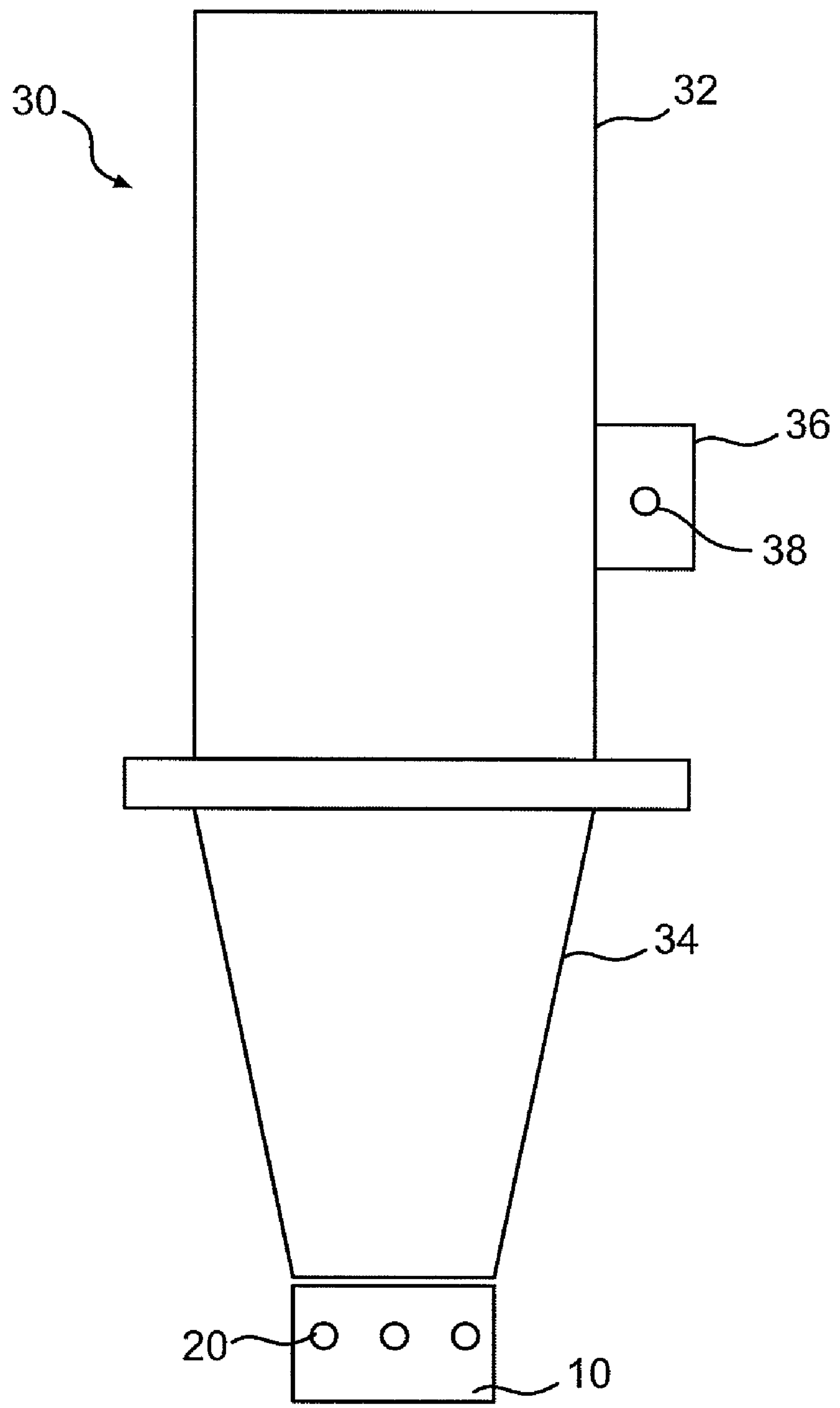
FIG. 3 is a side view depicting an atomizer with monitoring features in accordance with the preferred embodiments of the invention.

FIG. 3 illustrates an exemplary atomizer 30 including an atomizer motor 32, drive components 34, and the atomizer wheel 10, as would readily be understood by a skilled artisan. A box 36 (e.g. sensor box) containing a transceiver and a RFID tag 38 is mounted to a side of the atomizer 30, adjacent the atomizer motor 32. Inside the box 36 is a small sensor for detecting current, as would be readily understood by a person of skill in the art. While not being limited to a particular theory, when the atomizer 30 is in service, current flows through the motor 32 and is detected by the sensor, thereby determining that the atomizer is in service. Conversely, when no current is detected, the atomizer is not in service. The box 36 also includes an antenna for transmitting the signal received by the sensor, as readily understood by a skilled artisan. As noted above, the tag 38 contains information associated with the parts within the atomizer 30, and if desired, with the drive components and feed components 34. The host computer 40 then updates its runtime information based on whether the atomizers are in service.

Figure 4:
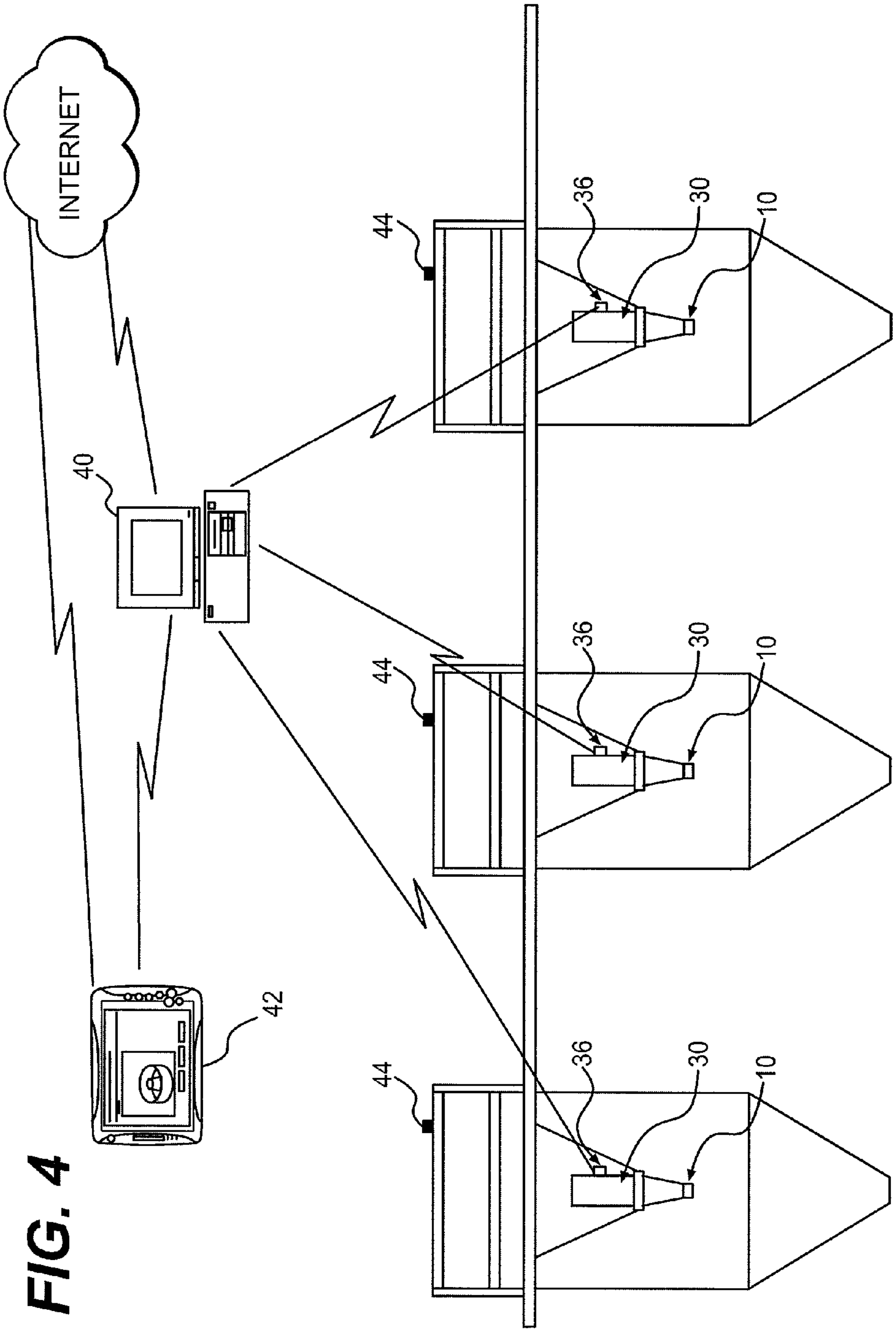
FIG. 4 shows an exemplary data stream of the Atomizer Monitoring System in accordance with the preferred embodiments of the invention.

FIG. 4 depicts an exemplary data stream route from a plurality of atomizers 30. Periodically, e.g., every six minutes, a host computer 40 preferably located near the atomizers (e.g., on the atomizer deck) communicates with the sensor boxes 36 on each of the atomizers 30 and inquire as to whether that atomizer is on. A mobile computer 42 includes a RFID writer/reader, which communicates with the RFID tags 26, 28 and 38 attached to the atomizer head 10 and atomizer 30. The RFID writer/reader of the mobile computer 42 also communicates with reactor RFID tags 44, with each of the reactor RFID tags located adjacent a respective reactor or chamber (e.g., on the handrail). The reactor RFID tags 44 store information related to its respective reactor and identifies the atomizer located in the reactor. For example, each reactor RFID tag 44 includes identification information of its respective reactor/chamber, its atomizer 30 and its atomizer head 10.

While not being limited to a particular theory, the atomizer system implements a preferred procedure that enables the software, via the writer/reader, mobile computer 42 and host computer 40 to associate the identification and parts information of the atomizer head RFID tags 26, 28, and the atomizer RFID tag 38 with the reactor/chamber in which the atomizer is placed. During the operation procedure, a user stores information of the wear parts in an atomizer head 10—used with a respective atomizer 30—in the atomizer head RFID tags 26, 28 via the writer/reader. Then the user enters atomizer and wear parts information in the atomizer's RFID tag 38 via the writer/reader. When the atomizer 30 is loaded in the reactor/chamber, the user enters identification information of the atomizer and atomizer head in the respective reactor RFID tag 44. The host computer 40 associates the tags for each chamber as instructed by the software. The associations are confirmed when the atomizer is removed from its reactor/chamber to ensure that the atomizers and parts thereof were assembled and identified according to the preferred procedure.

The mobile computer 42 (e.g., mobile PC) is preferably portable and in communication with the host computer 40 and the internet as desired to upload and download information related to the operation, monitoring and maintenance of the atomizers. As such, the information obtained from the tags via the reader/writer is sent from the mobile computer to the host computer, which updates the operation time and identification of the atomizer parts as communicated from the tags. All computers are ruggedized to withstand the harsh conditions within the spray dryer atomizer environment, as readily understood by a skilled artisan. The tag responds to the RFID reader's interrogation signal with an RF signal based upon what is detected by the sensor to the computer. Information about the part and its contents to which the tag is attached is stored in the tag. By holding or placing the RFID writer/reader in proximity to the tag, all the information stored in the tag can be obtained on the writer/reader. The mobile computer 42 takes that information and reports it to the web page or the host computer 40, as shown, for example, in FIG. 4. Similarly, the writer/reader may be utilized for writing new information to be stored on the tag.

A typical desulfurization system includes one to five reactors or chambers per desulfurization unit. Years ago, for a typical five reactor desulfurization unit, four chambers was sufficient to allow a power plant to comply with EPA emission requirements at full capacity, which allowed the fifth reactor/chamber as a spare when one of the atomizers required service. However, with power plants now running at greater megawatt capacity than before, the load required of the atomizers to meet emission requirements increases, and all five reactors/chambers and associated atomizers are generally needed to comply with the latest EPA requirements at full capacity. Accordingly, current desulfurization systems typically include a spare atomizer located on-site that maybe interchanged with a working atomizer in need of service. While not being limited to a particular theory, an atomizer that needs servicing is switched with the spare atomizer, and then may be moved to a different location preferably with the mobile computer 42. The mobile computer preferably also includes instructions for servicing the removed atomizer. Of course the reactor RFID tag 44 associated with the reactor/chamber loaded with the previously spare atomizer is updated with the identification of the newly loaded atomizer and atomizer head, and the updated information is forwarded to the mobile computer and the host computer for identifying and monitoring the newly loaded atomizer and parts thereof. Referring to the web-based RFID system of the present invention, a history page exists on the web page wherein a user can input information about a particular part in the atomizer by keying in a manufacturer, part number and serial number. In response, the system will identify the chamber and atomizer where that part is located, e.g., chamber #2, atomizer #4.

Figure 5:
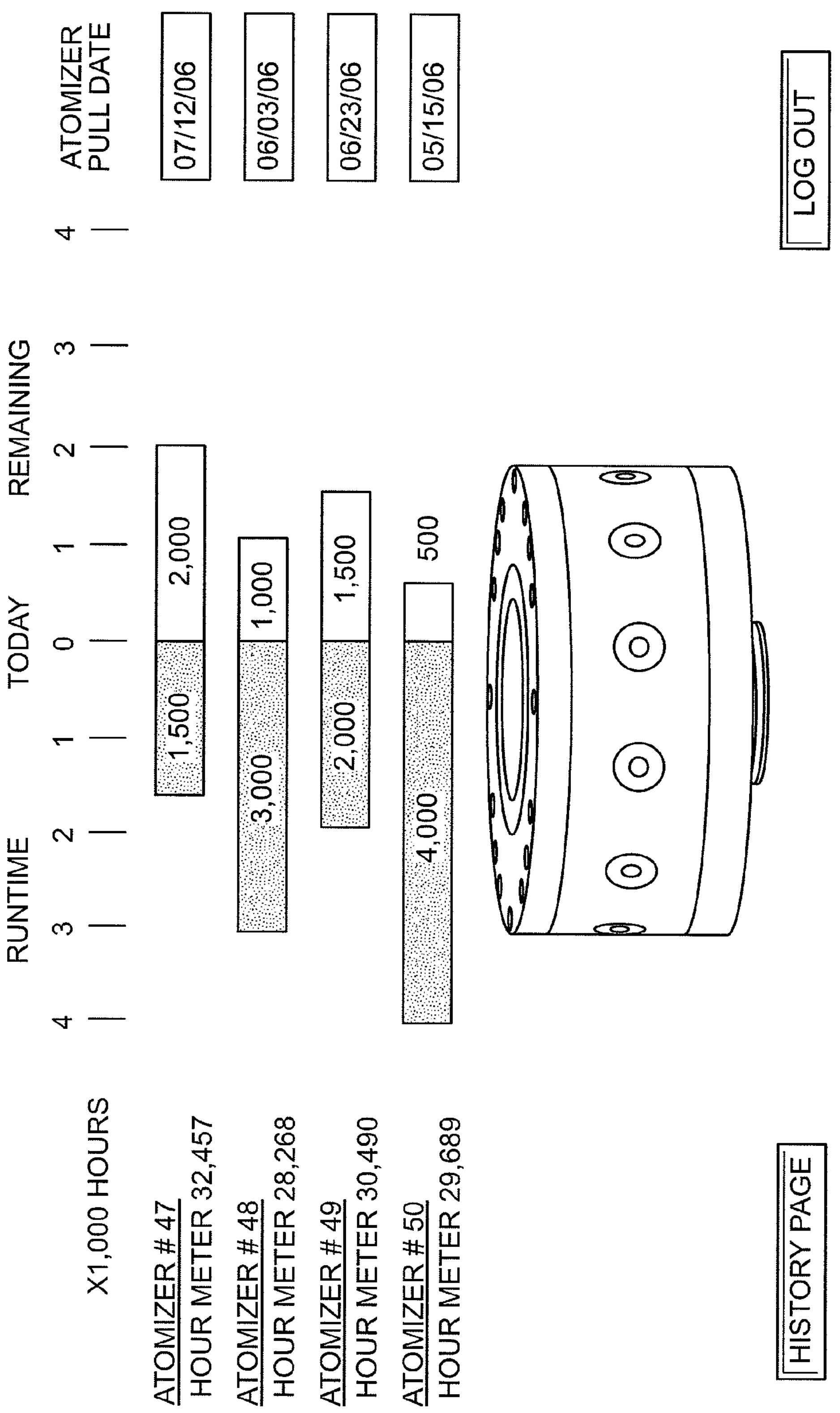
FIG. 5 illustrates a status page of the Atomizer Monitoring System.

Referring now to FIG. 5, there is shown therein a page that appears on the system of the present invention illustrating at a glance the status of four atomizers (e.g., Atomizer #47, Atomizer #48, Atomizer #49, and Atomizer #50) running within a processing or treatment chamber wherein desulfurization of flue gases is occurring. As demonstrated in FIG. 5, at the time Atomizer #47 was put into service, it had 3,500 maximum hours of useful life remaining before it would have to be pulled for replacement of one of its parts due to life expectancy. According to FIG. 5, the inventive system determines how many hours Atomizer #47 has been in operation, i.e., 1,500 hours, the amount of hours remaining before service is required, e.g., 2,000 hours, and, the atomizer service date, i.e., Jul. 12, 2006. The system also performs similar calculations for the remaining atomizers.

Figure 6:
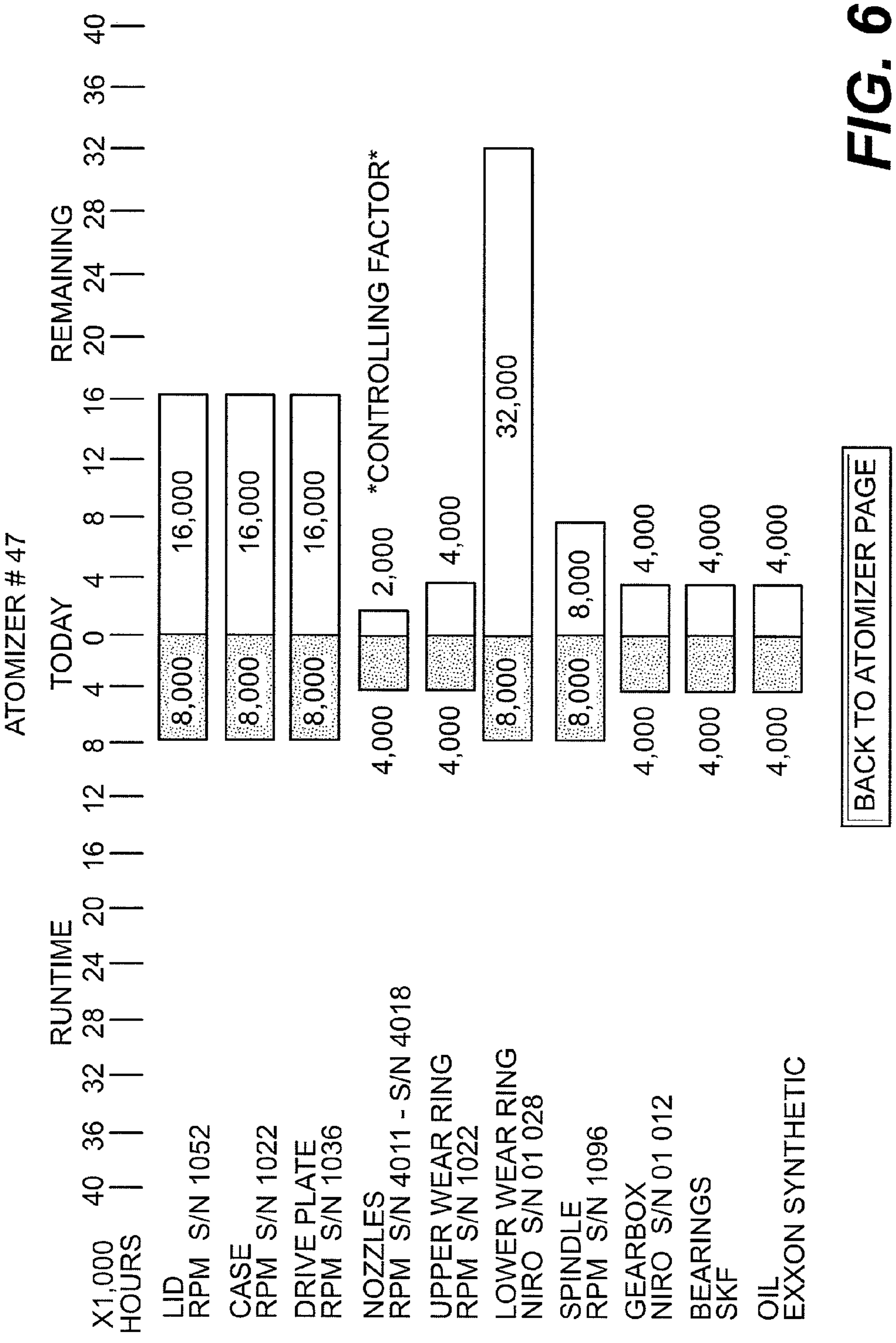
FIG. 6 shows a detailed status page of wear parts used in one of the exemplary atomizers in accordance with the preferred embodiments.

FIG. 6 depicts a page on the system of the present invention that provides a more detailed explanation as to why Atomizer #47 needs to be serviced in the next 2000 hours. As demonstrated in FIG. 6, Atomizer #47 includes numerous parts that are tracked utilizing RFID tags, e.g., a lid 12, a case 14, a drive plate 16, several wear inserts 20, an upper wear ring, a lower wear ring, a spindle, a gearbox, bearings, and oil. Based upon hours remaining of the various parts, the wear inserts have the least amount of hours remaining before replacement is required, i.e., 2,000 hours, thus, the wear inserts are the controlling factor or critical path for determining hours remaining before service on Atomizer #47 is required. The remaining parts shown in FIG. 6 all have remaining life exceeding 2000 hours. For example, the lid 12 has 16,000 hours remaining. According to FIG. 6, once Atomizer #47 is taken out of service at 2,000 hours and the wear inserts are replaced, there will be an additional 2,000 hours of run time before the atomizer will need to be taken out of service again for replacement of the upper wear ring, the gearbox, bearings and the oil, all of which will become due for replacement at the same time. Preferably, the serial numbers and manufacturer for the various parts are provided by the RFID tags.

Figure 7:
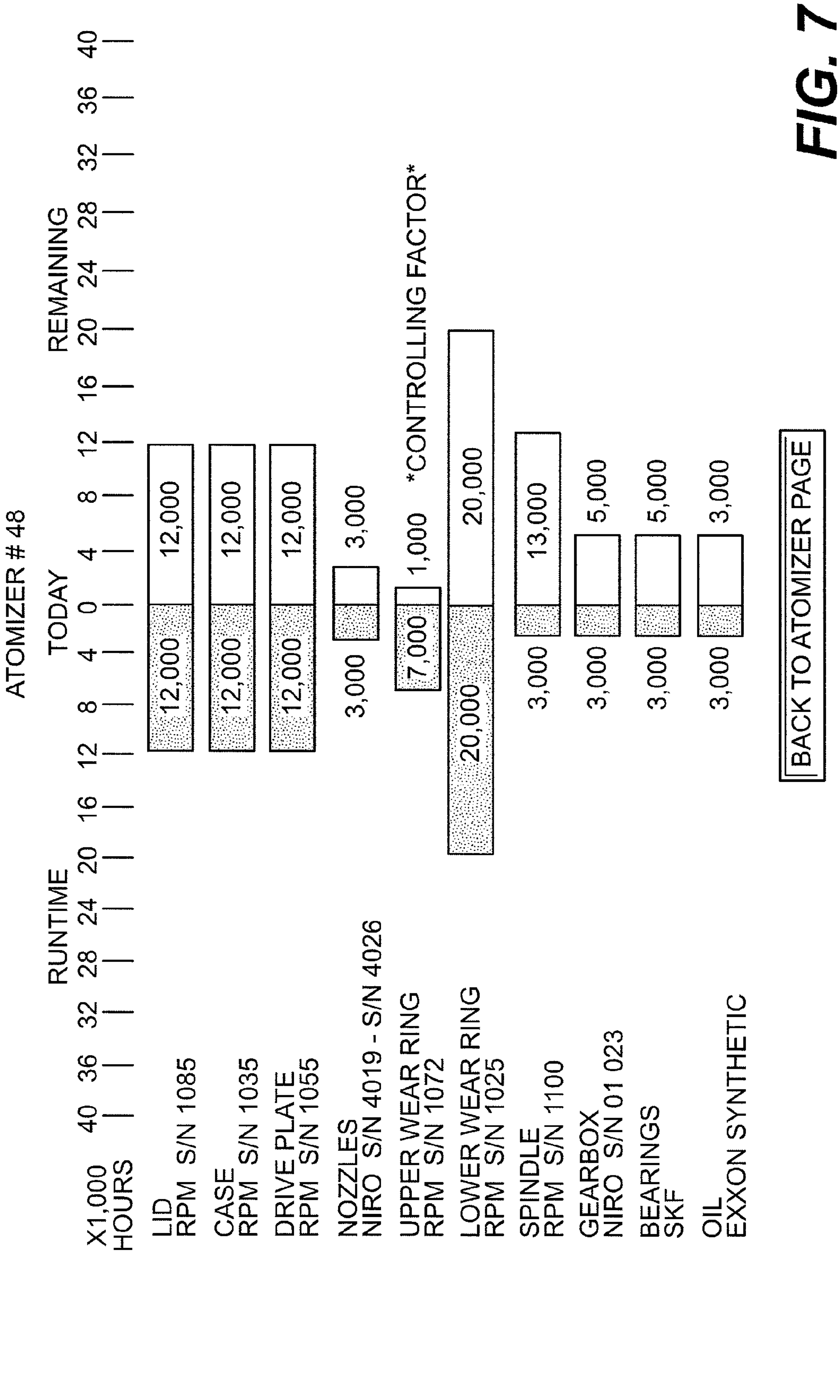
FIG. 7 illustrates a detailed status page of wear parts used in a second one of the exemplary atomizers in accordance with the preferred embodiments.
Figure 8:
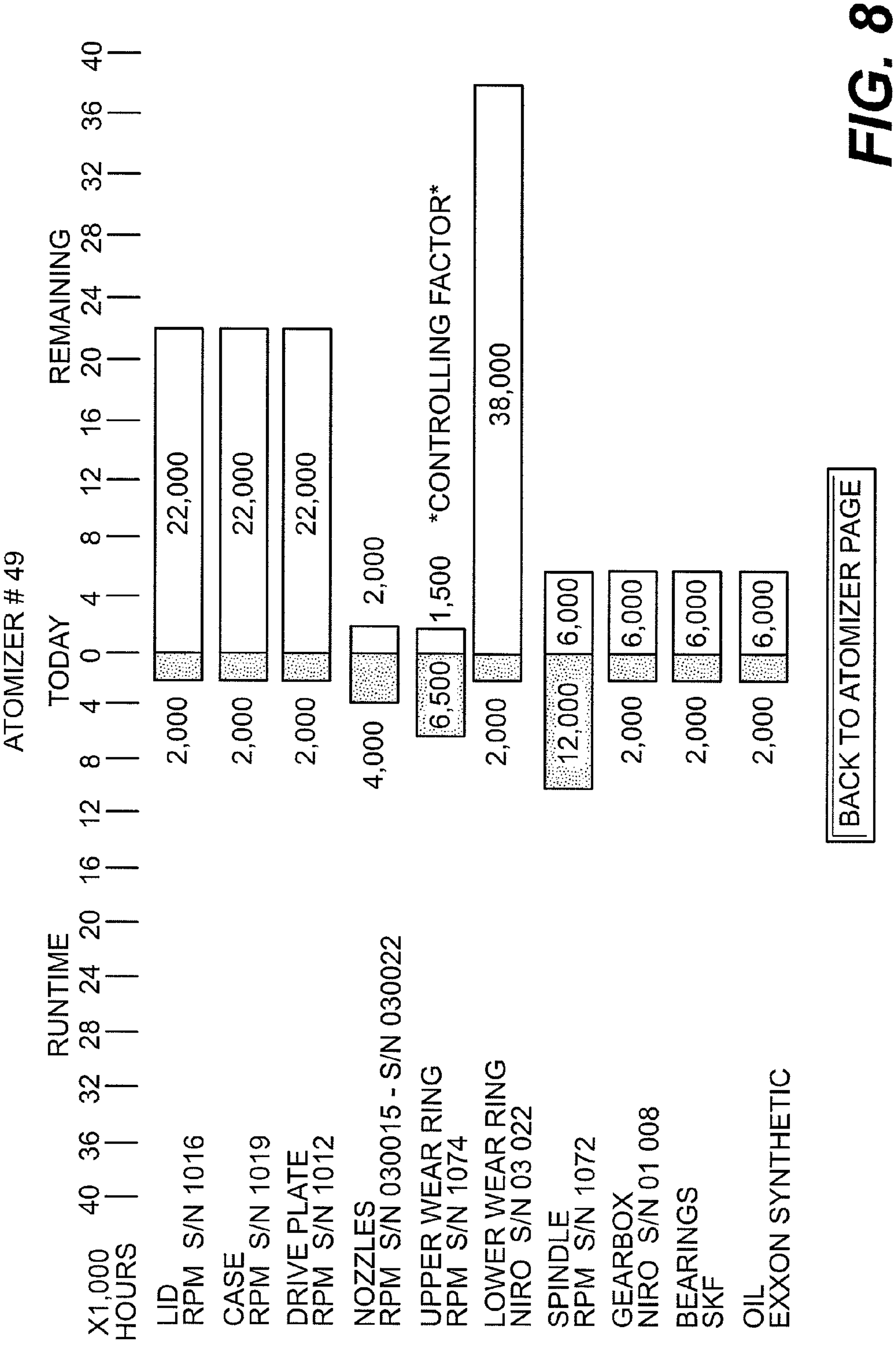
FIG. 8 shows a detailed status page of wear parts used in a third one of the exemplary atomizers in accordance with the preferred embodiments.

FIGS. 7 and 8 depict system pages showing a snapshot of the status of parts used in Atomizers 48 and 49, respectively. As shown in FIG. 7, the upper wear ring has the least time remaining (e.g., 1000 hours) before replacement is suggested, and is thus the controlling factor for determining when service is required. Similarly as shown in FIG. 8, the upper wear ring has the least time remaining (e.g., 1500 hours) before replacement is suggested. However, the page shown in FIG. 8 indicates that the nozzles are due for replacement (e.g., 2000 hours) soon after the suggested replacement time for the upper wear ring. If the service time of the upper wear ring can be stretched for 500 hours, or 6.25%, beyond its suggested service time of 8000 hours, then the atomizer wheel can be taken out of service on a single occasion to replace the upper wear ring and the nozzle. Alternatively, both the upper wear ring and the nozzle could be replaced at 1500 hours, or between 1500 and 2000 hours. Thus, the need for removing the atomizer wheel from service on two separate occasions could be reduced to one occasion, which saves downtime and increases efficiency.

Figure 9:
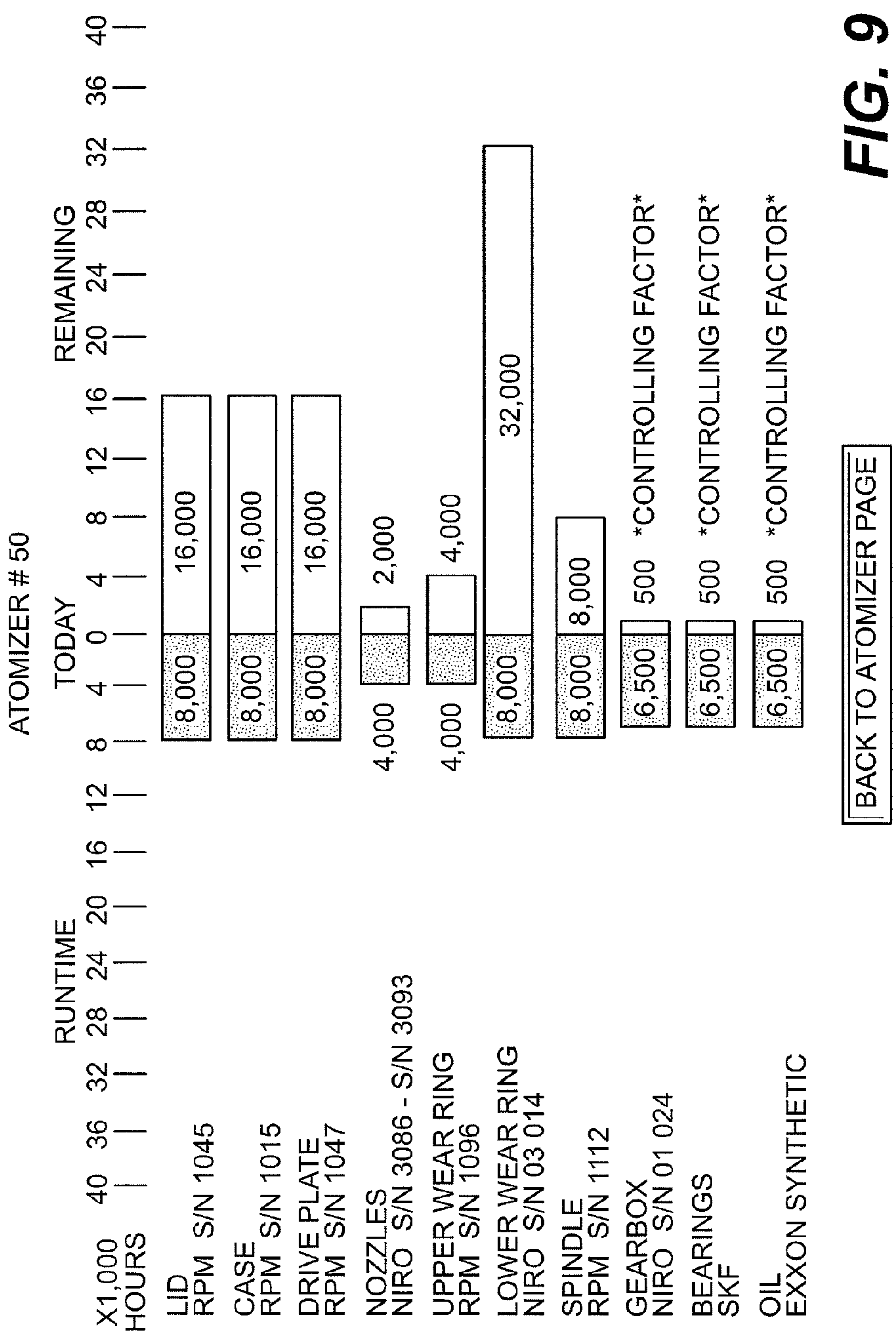
FIG. 9 illustrates a detailed status page of wear parts used in a fourth one of the exemplary atomizers of the preferred embodiments of the invention.

Referring again to FIG. 5, Atomizer #50 includes an urgent indication signifying that the atomizer has less than 500 hours of life expectancy remaining before it will need to be taken out of service. Reference to FIG. 9 demonstrates that the gearbox, bearings and oil are all due for replacement in 500 hours, all of which are controlling factors. A 7,000 hour maximum life expectancy was set for those three items.

FIG. 9 also shows that wear inserts are due to be replaced within the next 2000 hours. If the gearbox, bearings and oil can be stretched for 1,000 hours beyond the remaining 500 hours, then the atomizer wheel can be taken out of service on a single occasion for replacing the wear inserts as well as the gearbox, bearings and oil. Accordingly, again the need for removing the atomizer wheel from service on two separate occasions could be reduced to one occasion, thus saving downtime and increasing efficiency. FIG. 9 demonstrates information available to the user to make such informed judgment calls.

FIGS. 6-9 depict status pages illustrating useful output information available to a user for tracking the expired and remaining service time of parts used in atomizers. It is understood that the steps for providing the output information and operating the Atomizer Monitoring System may be embodied as computer program instructions on a computer-readable carrier such as a magnetic or optical memory, a magnetic or optical disk or a radio-frequency, audio-frequency or optical carrier wave. The computer program instructions preferably also include instructions for the maintenance, disconnection and assembly of the parts of the atomizers. Of course the computer program is preferably accessible from the mobile PC, the host computer, or a remote computer via the internet. FIGS. 5-9, along with the computer, demonstrate an exemplary means for displaying the expired remaining time for the individual components to indicate when service for said atomizer is required as would readily be understood by a skilled artisan. While not being limited to a particular theory, all times on the display pages of FIGS. 5-9 are updated continuously in association with the periodic communications between the host computer 40 and the sensor boxes 36 (e.g., about every six minutes).

FIG. 10 depicts a life expectancy page showing the service time life expectancy for the various parts of the atomizer head 10 from various manufacturers. Referring now to FIGS. 6 through 10, wear inserts (e.g., nozzles) made by a particular manufacturer are presently set at 6,000 hours of life expectancy. Based upon previous inspections of wear on the wear inserts at 6,000 hours, a system user may determine that the wear inserts are capable of lasting an additional 2,000 hours. If it is shown that the wear inserts do in fact last an additional 2,000 hours, the user can send a message to the system administrator alerting him to this fact.

As shown in FIG. 10, the system administrator can increase the life expectancy of the wear inserts of a particular manufacturer from 6,000 hours to 8,000 hours. This adjustment will automatically update all remaining pages in the system to reflect an increase in remaining life of all wear inserts made by this particular manufacturer in an amount of 2,000 hours, thus increasing the length of the horizontal bars associated with these wear inserts. Since there is typically no accurate wear life history available for most of the atomizer parts, life expectancy histories of the parts are first created based upon first-guess estimates, or suggestions from the respective manufacturer, and then adjusted upwardly or downwardly as additional actual history data is accumulated. Similar upward or downward adjustments can be made to all parts being tracked in the system.

Each part has a unique serial number which can be tracked regardless of the atomizer in which that part is being used. For example, the lid of Atomizer #47 has a serial number of RPM S/N 1052. That lid utilized in Atomizer #47 for 8,000 hours, may be taken from Atomizer #47 and used in another atomizer, e.g., Atomizer #49. The system will continue to track the location of that lid and the cumulative amount of hours it has been in service. The current sensor is similar to a trigger for a timer or stop watch keeping track of the elapsed time the part is in service and stopping the tracking elapsed time when the part is not in service. In this manner, the amount of time parts, e.g., wear inserts, can be tracked and vendors can enter agreements to lease parts based upon number of hours the part has been in service as opposed to selling them outright. Preferably the host computer associated with the system is the timer or stop watch, and keeps track of the elapsed time the parts are in service based on the on/off trigger times actuated by the sensor and communicated back to the host computer.

As demonstrated above, the system of the present invention enables users to obtain real-time knowledge of part locations and part wear via a computer in communication with wireless sensors and RFID tags. Also, the host computer can call out to each atomizer in the system and ask whether or not it is in service. In the event a signal is received from the atomizer indicating that the atomizer is not in service, then the system will not elapse service time for the parts of that atomizer, including the atomizer wheel, until such a signal is received indicating that the atomizer has been placed into service. In this manner, no atomizer parts will accumulate service time during times when the atomizer is not in service, e.g., when it is a back-up. In this manner, the wear life of parts, can be compared on a fair basis over time. Also, parts will not be inadvertently replaced before their life expectancy expires. As discussed above, upon predetermined intervals—preferably every 6 minutes—the wireless sensor sends a status call from each of the atomizers that are currently in service. Obtaining such information will also improve inventory control.

When conducting maintenance, e.g., replacing parts within a particular atomizer, once old parts have been removed and replaced with new parts, the user can review the list of parts in that particular atomizer to assure that the manufacturer and serial number for each part on the list is accurate and update the list by writing to the RFID tag to reflect the replacements that have been made during the maintenance. Once the information has been received by the tag and the system has been updated, the tag will store that updated information until it is read during the next maintenance event. All of the assembly and disassembly procedures for the atomizers are web based and that the part numbers and serial numbers along with the part wear life history page is interactive with the atomizer monitoring system data reporting.

There are challenges in applying RFID tags to spray dryer atomizer components as the spray dryer atomizer presents a harsh operating environment with substantial G-force loading caused by rotation of the atomizer wheel at 10,000 rpms; elevated temperatures, e.g., 300 to 400 degrees, significant wear and abrasion, and corrosion because it is such a caustic environment, and the ability to read and write through metal. In order to protect the tags in this harsh operating environment, the tags are preferably encapsulated within a resilient temperature resistant material (e.g., silicon, resin, ceramic) that allows radio frequency communication therethrough. The resilient temperature resistant material protects the encapsulated tags from exposure to the caustic abrasive heated environment, and helps to secure the tag to its location. Tags used and protected in the manner described survive the harsh environment associated with an atomizer and approach 100% read/write accuracy of large quantities of data. Moreover, visual line-of-sight is not required, as with traditional approaches of identification (e.g., metal etching, metal stamping, chemical etching, laser marking). While not being limited to a particular theory, the RFID tags and reader/writers operate at a frequency of about 13.56 MHz. It should be noted that the system is not limited to this frequency range, as other frequencies are available to the RFID system above and below 13.56 MHZ, including, for example, 900 MHz.

The preferred embodiments of the invention realize several benefits provided from using RFID tags in atomizers. RFID tags can be applied to spray dryer atomizer (SDA) components other than the atomizer wheel, e.g., the atomizer motor, and the parts of these other components can be tracked in similar fashion. Since atomizer wheels can be removed and placed on other atomizers, the system of the present invention provides a means for tracking which wheel is associated with which atomizer.

It is understood that the Atomizer Monitoring System described and shown are exemplary indications of preferred embodiments of the invention, and are given by way of illustration only. In other words, the concept of the present invention may be readily applied to a variety of preferred embodiments, including those disclosed herein. While the invention has been described in detail and with reference to specific examples thereof, it will be apparent to one skilled in the art that various changes and modifications can be made therein without departing from the spirit and scope thereof. For example, a skilled artisan would understand that there are numerous ways to detect when an atomizer is in service, in addition to detecting current. Without further elaboration the foregoing will so fully illustrate the invention that others may, by applying current or future knowledge, readily adapt the same for use under various conditions of service.

What is claimed is:

1. A monitoring system for collecting data relating to wear components of an atomizer for determining when the wear components are in need of replacement, comprising:

an atomizer including an atomizer wheel, a motor and gear box, and feed components, at least one of the atomizer wheel, motor and gear box including the wear components, the wear components being concealed from visual inspection during operation of the atomizer with each wear component having a remaining service time;

a RFID tag attached to said atomizer, said RFID tag storing data associated with the wear components used in said atomizer;

a RFID reader in communication with said RFID tag for retrieving the stored data associated with the wear components used in said atomizer;

a sensor adjacent said atomizer that monitors when said atomizer is in use;

a computer in communication with said sensor for recording a period of time when said atomizer is in use, adjusting the remaining service time for each of the wear components, and indicating when service for said atomizer is required based on one of the adjusted remaining service times.

2. The monitoring system of claim 1, wherein said RFID tag is embedded in said atomizer wheel and stores data associated with the wear components used in said atomizer wheel.

3. The monitoring system of claim 2, wherein said atomizer wheel includes a lid, said RFID tag is a first RFID tag embedded in said lid, and further comprising a second RFID tag embedded in said lid opposite said first RFID tag to counterbalance said first RFID tag, said second RFID tag also storing data associated with the wear components used in said atomizer.

4. The monitoring system of claim 3, further comprising a third RFID tag located adjacent said motor and storing data associated with the wear components used in said motor.

5. The monitoring system of claim 1, further comprising a mobile PC embedding said RFID reader, said mobile PC in communication with said computer to forward the stored data associated with the wear components used in said atomizer and an identification of said atomizer to said computer.

6. The monitoring system of claim 1, wherein said computer displays the service time life expectancy, an expired service time and the expected remaining service time for the wear components to indicate when service for said atomizer is required.

7. A monitoring system for collecting data, comprising:

a treatment chamber located in a caustic environment having a plurality of wear components, the wear components having different lengths of wear life and being concealed from visual inspection during operation of the treatment chamber with each wear component having a remaining service time;

a RFID tag attached to said treatment chamber, said RFID tag identifying said treatment chamber and storing data associated with the wear components used in said treatment chamber;

a RFID reader in communication with said RFID tag for retrieving the stored data associated with the wear components used in said treatment chamber;

a sensor adjacent said treatment chamber that monitors when said treatment chamber is in use;

a computer in communication with said sensor for recording a period of time when said treatment chamber is in use, adjusting the remaining service time for each of the wear components, and indicating when service for said treatment chamber is required based on one of the adjusted remaining service times.

8. The monitoring system of claim 7, wherein said RFID tag is embedded in one of the wear components of said treatment chamber and stores data associated with the wear components used in said treatment chamber.

9. The monitoring system of claim 8, wherein said treatment chamber includes an atomizer wheel having a lid, said RFID tag is a first RFID tag embedded in said lid, and further comprising a second RFID tag embedded in said lid opposite said first RFID tag to counterbalance said first RFID tag, said second RFID tag also storing data associated with the wear components used in said treatment chamber.

10. The monitoring system of claim 9, further comprising a third RFID tag located adjacent said treatment chamber and storing data associated with the wear components used in said treatment chamber.

11. The monitoring system of claim 7, further comprising a mobile PC embedding said RFID reader, said mobile PC in communication with said computer to forward the stored data associated with the wear components and an identification of said treatment chamber to said computer.

12. The monitoring system of claim 7, wherein said computer displays the service time life expectancy, the expired service time and the expected remaining service time for the wear components to indicate when service of said wear components is required.

13. A method for determining when wear components of an atomizer are in need of replacement, comprising:

(a) attaching a RFID tag to an atomizer having wear components therein operating in a caustic environment, each of the wear components being concealed from visual inspection during operation of the atomizer and having a remaining service time;

(b) storing data in the RFID tag associated with the wear components of the atomizer;

(c) determining when the atomizer is in use;

(d) retrieving the stored data associated with the wear components from the RFID tag attached to the atomizer;

(e) adjusting the remaining service time for each of the wear components based on an amount of time the atomizer is in use; and (f) indicating when service for said atomizer is required based on one of the remaining service times.

14. The method of claim 13, further comprising recording the period of time when the atomizer is in use.

15. The method of claim 13, further comprising updating the stored data based on information associated with the atomizer.

16. The method of claim 13, wherein step (f) includes displaying the service time life expectancy, an expired service time and the expected remaining service time of the wear components to indicate when service for said atomizer is required.

17. The method of claim 13, wherein step (a) includes embedding the RFID tag in an atomizer wheel of the atomizer, and step (b) includes storing data in the RFID tag associated with the wear components used in the atomizer wheel.

18. The method of claim 17, wherein the RFID tag is a first RFID tag embedded in the atomizer wheel, and further comprising embedding a second RFID tag in the atomizer wheel opposite the first RFID tag to counterbalance the first RFID tag, and storing data in the second RFID tag associated with the wear components used in the atomizer wheel.

19. The method of claim 18, further comprising embedding a third RFID tag adjacent a motor of the atomizer, and storing data in the third RFID tag associated with the wear components used in the motor.

* * * * *